US008020283B2

(12) United States Patent
Munn

(10) Patent No.: US 8,020,283 B2
(45) Date of Patent: Sep. 20, 2011

(54) HIGH-SPEED RFID CIRCUIT PLACEMENT DEVICE

(75) Inventor: Jason D. Munn, Clinton, SC (US)

(73) Assignee: Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 12/685,191

(22) Filed: Jan. 11, 2010

(65) Prior Publication Data
US 2010/0172737 A1 Jul. 8, 2010

Related U.S. Application Data

(62) Division of application No. 11/931,478, filed on Oct. 31, 2007, now Pat. No. 7,669,318, which is a division of application No. 10/947,010, filed on Sep. 22, 2004, now Pat. No. 7,500,307.

(51) Int. Cl.
B23P 19/00 (2006.01)

(52) U.S. Cl. ............... 29/743; 29/739; 29/740; 29/729; 29/592.1; 414/752.1

(58) Field of Classification Search .................... 29/729, 29/739–743, 832–834, 592.1, 600–601, 709, 29/593; 343/700 MS, 873; 340/572.1–572.4, 340/572.8; 414/752.1–752.7, 941; 901/30–32
See application file for complete search history.

(56) References Cited

U.S. PATENT DOCUMENTS

| 3,724,737 A | 4/1973 | Bodnar |
| 3,891,157 A | 6/1975 | Justus |
| 3,989,575 A | 11/1976 | Davies et al. |
| 4,242,663 A | 12/1980 | Slobodin |
| 4,480,742 A | 11/1984 | Muylle |
| 4,818,312 A | 4/1989 | Benge |
| 4,900,386 A | 2/1990 | Richter-Jorgensen |
| 4,910,499 A | 3/1990 | Benge et al. |
| 5,153,983 A | 10/1992 | Oyama |
| 5,264,061 A | 11/1993 | Juskey et al. |
| 5,519,381 A | 5/1996 | Marsh et al. |

(Continued)

FOREIGN PATENT DOCUMENTS
DE 196 34 473 1/1998
(Continued)

OTHER PUBLICATIONS

Sarma, Auto-ID Center, Published Nov. 1, 2001, pp. 1-19, "White Paper—Towards the 5 cent Tag".

Primary Examiner — Minh Trinh

(57) ABSTRACT

A high-speed process includes removing chips or interposers from a carrier web having a first pitch and transferring the chips or interposers to electrical components, such as RFID antenna structures, on a moving web having a second pitch. According to one method, a transfer drum transfers chips or interposers to a moving web of electrical components by picking a chip when the transfer drum is stationary, and transferring the chip to the moving web when the transfer drum is rotating such that a tangential velocity of the transfer drum is substantially equal to the linear velocity of the moving web. According to another method, a primary drum removes chips or interposers from a carrier web having a first pitch, and transfers the chips or interposers to a variably rotating secondary drum which then places the chips or interposers onto an electrical component on a moving web having a second pitch.

13 Claims, 10 Drawing Sheets

U.S. PATENT DOCUMENTS

| | | | |
|---|---|---|---|
| 5,528,222 A | 6/1996 | Moskowitz et al. | |
| 5,537,105 A | 7/1996 | Marsh et al. | |
| 5,545,291 A | 8/1996 | Smith et al. | |
| 5,550,547 A | 8/1996 | Chan et al. | |
| 5,557,280 A | 9/1996 | Marsh et al. | |
| 5,564,888 A | 10/1996 | Doan | |
| 5,566,441 A | 10/1996 | Marsh et al. | |
| 5,585,193 A | 12/1996 | Josephy et al. | |
| 5,612,513 A | 3/1997 | Tuttle et al. | |
| 5,613,228 A | 3/1997 | Tuttle et al. | |
| 5,645,932 A | 7/1997 | Uchibori | |
| 5,682,143 A | 10/1997 | Brady et al. | |
| 5,728,599 A | 3/1998 | Rostoker et al. | |
| 5,783,856 A | 7/1998 | Smith et al. | |
| 5,824,186 A | 10/1998 | Smith et al. | |
| 5,837,349 A | 11/1998 | Van Erden et al. | |
| 5,904,545 A | 5/1999 | Smith et al. | |
| 5,939,984 A | 8/1999 | Brady et al. | |
| 5,946,198 A | 8/1999 | Hoppe et al. | |
| 5,963,177 A | 10/1999 | Tuttle et al. | |
| 5,972,152 A | 10/1999 | Lake et al. | |
| 5,972,156 A | 10/1999 | Brady et al. | |
| 5,973,600 A | 10/1999 | Mosher, Jr. | |
| 5,982,284 A | 11/1999 | Baldwin et al. | |
| 5,982,628 A | 11/1999 | Houdeau et al. | |
| 6,018,299 A | 1/2000 | Eberhardt | |
| 6,019,865 A | 2/2000 | Palmer et al. | |
| 6,027,027 A | 2/2000 | Smithgall | |
| 6,043,746 A | 3/2000 | Sorrells | |
| 6,045,652 A | 4/2000 | Tuttle et al. | |
| 6,078,259 A | 6/2000 | Brady et al. | |
| 6,081,243 A | 6/2000 | Lake | |
| 6,082,660 A | 7/2000 | Meyer | |
| 6,091,332 A | 7/2000 | Eberhardt et al. | |
| 6,094,138 A | 7/2000 | Eberhardt et al. | |
| 6,104,291 A | 8/2000 | Beauvillier et al. | |
| 6,107,920 A | 8/2000 | Eberhardt et al. | |
| 6,121,878 A | 9/2000 | Brady et al. | |
| 6,140,146 A | 10/2000 | Brady et al. | |
| 6,145,901 A | 11/2000 | Rich | |
| 6,147,605 A | 11/2000 | Vega et al. | |
| 6,147,662 A | 11/2000 | Grabau et al. | |
| 6,163,260 A | 12/2000 | Conwell et al. | |
| 6,164,137 A | 12/2000 | Hancock et al. | |
| 6,164,551 A | 12/2000 | Altwasser | |
| 6,165,386 A | 12/2000 | Endo et al. | |
| 6,177,859 B1 | 1/2001 | Tuttle et al. | |
| 6,189,208 B1 | 2/2001 | Estes et al. | |
| 6,206,292 B1 | 3/2001 | Robertz et al. | |
| 6,215,401 B1 | 4/2001 | Brady et al. | |
| 6,246,326 B1 | 6/2001 | Wiklof et al. | |
| 6,246,327 B1 | 6/2001 | Eberhardt | |
| 6,252,508 B1 | 6/2001 | Vega et al. | |
| 6,259,369 B1 | 7/2001 | Monico | |
| 6,259,408 B1 | 7/2001 | Brady et al. | |
| 6,262,692 B1 | 7/2001 | Babb | |
| 6,265,977 B1 | 7/2001 | Vega et al. | |
| 6,271,793 B1 | 8/2001 | Brady et al. | |
| 6,271,801 B2 | 8/2001 | Tuttle et al. | |
| 6,274,508 B1 | 8/2001 | Jacobsen et al. | |
| 6,278,413 B1 | 8/2001 | Hugh et al. | |
| 6,280,544 B1 | 8/2001 | Fox et al. | |
| 6,281,036 B1 | 8/2001 | Niki et al. | |
| 6,281,795 B1 | 8/2001 | Smith et al. | |
| 6,320,556 B1 | 11/2001 | Cyman et al. | |
| 6,331,221 B1 | 12/2001 | Cobbley | |
| 6,342,843 B1 | 1/2002 | Hahn et al. | |
| 6,366,260 B1 | 4/2002 | Carrender | |
| 6,371,375 B1 | 4/2002 | Ackley et al. | |
| 6,384,727 B1 | 5/2002 | Diprizio et al. | |
| 6,392,545 B2 | 5/2002 | Lake et al. | |
| 6,404,341 B1 | 6/2002 | Reid | |
| 6,406,935 B2 | 6/2002 | Kayanakis et al. | |
| 6,410,112 B1 | 6/2002 | Hatfield | |
| 6,412,086 B1 | 6/2002 | Friedman et al. | |
| 6,416,608 B1 | 7/2002 | Mynott et al. | |
| 6,424,263 B1 | 7/2002 | Lee et al. | |
| 6,451,154 B1 | 9/2002 | Grabau et al. | |
| 6,452,496 B1 | 9/2002 | Van Horn et al. | |
| 6,487,681 B1 | 11/2002 | Tuttle et al. | |
| 6,496,113 B2 | 12/2002 | Lee et al. | |
| 6,501,157 B1 | 12/2002 | Cobbley | |
| 6,514,790 B1 | 2/2003 | Plettner et al. | |
| 6,549,176 B2 | 4/2003 | Hausladen | |
| 6,557,758 B1 | 5/2003 | Monico | |
| 6,606,247 B2 | 8/2003 | Credelle et al. | |
| 6,618,939 B2 | 9/2003 | Uchibori et al. | |
| 6,630,887 B2 | 10/2003 | Lake | |
| 6,630,910 B2 | 10/2003 | Forster et al. | |
| 6,645,327 B2 | 11/2003 | Austin et al. | |
| 6,646,554 B1 | 11/2003 | Goff et al. | |
| 6,662,430 B2 | 12/2003 | Brady et al. | |
| 6,665,193 B1 | 12/2003 | Chung et al. | |
| 6,696,952 B2 | 2/2004 | Zirbes | |
| 6,717,923 B1 | 4/2004 | Smith | |
| 6,720,865 B1 | 4/2004 | Forster et al. | |
| 6,739,047 B2 | 5/2004 | Hammond et al. | |
| 6,779,246 B2 | 8/2004 | Debraal | |
| 6,781,508 B2 | 8/2004 | Tuttle et al. | |
| 6,786,419 B2 | 9/2004 | Kayanakis | |
| 6,796,508 B2 | 9/2004 | Muller | |
| 6,798,121 B2 | 9/2004 | Nakatani et al. | |
| 6,809,045 B1 | 10/2004 | Alam et al. | |
| 6,816,380 B2 | 11/2004 | Credelle et al. | |
| 6,820,314 B2 | 11/2004 | Ferguson et al. | |
| 6,838,989 B1 | 1/2005 | Mays et al. | |
| 6,891,110 B1 | 5/2005 | Pennaz et al. | |
| 6,951,596 B2 * | 10/2005 | Green et al. | 156/264 |
| 7,237,319 B2 | 7/2007 | Kasahara et al. | |
| 7,278,203 B2 * | 10/2007 | Aoyama et al. | 29/740 |
| 7,446,663 B2 | 11/2008 | Rowe, Jr. | |
| 7,500,307 B2 * | 3/2009 | Munn | 29/832 |
| 7,623,034 B2 * | 11/2009 | Ferguson et al. | 340/572.1 |
| 7,669,318 B2 * | 3/2010 | Munn | 29/832 |
| 2001/0030628 A1 | 10/2001 | Brady et al. | |
| 2002/0011677 A1 | 1/2002 | Yokoi et al. | |
| 2002/0049093 A1 | 4/2002 | Reyes et al. | |
| 2002/0067268 A1 | 6/2002 | Lee et al. | |
| 2002/0082368 A1 | 6/2002 | Zahalka | |
| 2002/0129488 A1 | 9/2002 | Lieberman | |
| 2002/0167405 A1 | 11/2002 | Shanks et al. | |
| 2002/0171591 A1 | 11/2002 | Beard | |
| 2002/0195194 A1 | 12/2002 | Grabau et al. | |
| 2002/0195195 A1 | 12/2002 | Grabau et al. | |
| 2003/0034127 A1 | 2/2003 | Segawa | |
| 2003/0036249 A1 | 2/2003 | Bauer et al. | |
| 2003/0062783 A1 | 4/2003 | Horng et al. | |
| 2003/0080919 A1 | 5/2003 | Forster et al. | |
| 2003/0089444 A1 | 5/2003 | Melzer et al. | |
| 2003/0102541 A1 | 6/2003 | Gore et al. | |
| 2003/0117334 A1 | 6/2003 | Forster et al. | |
| 2003/0121986 A1 | 7/2003 | Stromberg et al. | |
| 2003/0132893 A1 | 7/2003 | Forster et al. | |
| 2003/0136503 A1 | 7/2003 | Green et al. | |
| 2003/0151028 A1 | 8/2003 | Lawrence et al. | |
| 2003/0153269 A1 | 8/2003 | Smit et al. | |
| 2003/0209697 A1 | 11/2003 | Orsbon et al. | |
| 2004/0004295 A1 | 1/2004 | Stromberg et al. | |
| 2004/0005754 A1 | 1/2004 | Stromberg | |
| 2004/0032377 A1 | 2/2004 | Forster et al. | |
| 2004/0037053 A1 | 2/2004 | Akita et al. | |
| 2004/0040740 A1 | 3/2004 | Nakatani et al. | |
| 2004/0041739 A1 | 3/2004 | Forster et al. | |
| 2004/0061655 A1 | 4/2004 | Forster et al. | |
| 2004/0061994 A1 | 4/2004 | Kerr et al. | |
| 2004/0072385 A1 | 4/2004 | Bauer et al. | |
| 2004/0075616 A1 | 4/2004 | Endo et al. | |
| 2004/0089408 A1 | 5/2004 | Brod et al. | |
| 2004/0102870 A1 | 5/2004 | Andersen et al. | |
| 2004/0117985 A1 | 6/2004 | Chung et al. | |
| 2004/0151028 A1 | 8/2004 | Chih et al. | |
| 2004/0154161 A1 * | 8/2004 | Aoyama et al. | 29/739 |
| 2004/0155328 A1 | 8/2004 | Kline | |
| 2004/0173781 A1 | 9/2004 | Lawrence et al. | |
| 2004/0175515 A1 | 9/2004 | Lawrence et al. | |
| 2004/0175548 A1 | 9/2004 | Lawrence et al. | |
| 2004/0175550 A1 | 9/2004 | Lawrence et al. | |

| | | | | | | |
|---|---|---|---|---|---|---|
| 2004/0176032 | A1 | 9/2004 | Kotola et al. | JP | 2003-059337 | 2/2003 |
| 2004/0183182 | A1 | 9/2004 | Swindlehurst et al. | JP | 2003-281936 | 3/2003 |
| 2004/0188531 | A1 | 9/2004 | Gengel et al. | JP | 2003-281491 | 10/2003 |
| 2004/0192011 | A1* | 9/2004 | Roesner ............... 438/460 | JP | 2003-283120 | 10/2003 |
| 2004/0194876 | A1 | 10/2004 | Overmeyer et al. | JP | 2003-283121 | 10/2003 |
| 2004/0201112 | A1 | 10/2004 | Divigalpitiya et al. | JP | 2003-288570 | 10/2003 |
| 2004/0212544 | A1 | 10/2004 | Pennaz et al. | JP | 2004-038573 | 2/2004 |
| 2004/0215350 | A1 | 10/2004 | Roesner | JP | 2004-220304 | 5/2004 |
| 2004/0246099 | A1 | 12/2004 | Tuttle | JP | 2004-180217 | 6/2004 |
| 2005/0001725 | A1 | 1/2005 | Brady et al. | JP | 2004-334432 | 11/2004 |
| 2005/0007296 | A1 | 1/2005 | Endo et al. | WO | WO 00/14733 | 3/2000 |
| 2005/0021172 | A1 | 1/2005 | Winter et al. | WO | WO 00/16285 | 3/2000 |
| 2005/0024291 | A1 | 2/2005 | Aisenbrey | WO | WO 00/21031 | 4/2000 |
| 2005/0155213 | A1 | 7/2005 | Eastin | WO | WO 01/54058 | 7/2001 |
| 2006/0213609 | A1* | 9/2006 | Green et al. ............ 156/265 | WO | WO 01/61646 | 8/2001 |

FOREIGN PATENT DOCUMENTS

| | | |
|---|---|---|
| DE | 198 05 031 | 8/1999 |
| DE | 198 40 | 3/2000 |
| DE | 101 20 269 | 7/2002 |
| DE | 10 2004 015 994 | 4/2004 |
| EP | 0 902 475 | 3/1999 |
| EP | 0 979 790 | 2/2000 |
| EP | 1 039 543 | 9/2000 |
| EP | 1 479 040 | 11/2004 |
| FR | 2 775 533 | 9/1999 |
| JP | 2001-035989 | 2/2001 |
| JP | 2002-298104 | 10/2002 |
| JP | 2002-298107 | 10/2002 |
| JP | 2003-006594 | 1/2003 |
| WO | WO 01/95241 | 12/2001 |
| WO | WO 02/37414 | 5/2002 |
| WO | WO 02/49093 | 6/2002 |
| WO | WO 02/082368 | 10/2002 |
| WO | WO 02/093625 | 11/2002 |
| WO | WO 03/007232 | 1/2003 |
| WO | WO 03/107266 | 12/2003 |
| WO | WO 2004/046762 | 6/2004 |
| WO | WO 2004/079646 | 9/2004 |
| WO | WO 2004/084128 | 9/2004 |
| WO | WO 2004/100098 | 11/2004 |
| WO | WO 2004/100309 | 11/2004 |
| WO | WO 2005/006248 | 1/2005 |

* cited by examiner

HIGH-SPEED RFID CIRCUIT PLACEMENT DEVICE

CROSS-REFERENCE TO RELATED APPLICATIONS

The present application is a division of U.S. Ser. No. 11/931,478 filed Oct. 31, 2007, now U.S. Pat. No. 7,669,318, which is a division of U.S. Ser. No. 10/947,010 filed Sep. 22, 2004, now U.S. Pat. No. 7,500,307 issued Mar. 10, 2009, both of which are incorporated herein by reference in their entireties.

FIELD OF THE INVENTION

The present invention relates generally to the assembly of electronic devices. More particularly, the present invention relates to the assembly of radio frequency identification (RFID) interposers, inlays, and/or tags.

DESCRIPTION OF THE RELATED ART

Radio frequency identification (RFID) tags and labels (collectively referred to herein as "devices") are widely used to associate an object with an identification code. RFID devices generally have a combination of antennas and analog and/or digital electronics, which may include for example communications electronics, data memory, and control logic. Furthermore the RFID devices include structures to support and protect the antennas and electronics, and to mount or attach them to objects. For example, RFID tags are used in conjunction with security-locks in cars, for access control to buildings, and for tracking inventory and parcels. Some examples of RFID tags and labels appear in U.S. Pat. Nos. 6,107,920, 6,206,292, and 6,262,292, all of which are hereby incorporated by reference in their entireties.

As noted above, RFID devices are generally categorized as labels or tags. RFID labels are RFID devices that are adhesively or otherwise attached directly to objects. RFID tags, in contrast, are secured to objects by other means, for example by use of a plastic fastener, string or other fastening means. In addition, as discussed below, as an alternative to RFID tags and labels it is possible to mount or incorporate some or all of the antennas and electronics directly on the objects. As used herein, the term "transponders" refers both to RFID devices and to RFID combinations of antennas and analog and/or digital electronics wherein the antenna and/or electronics are mounted directly on the objects.

In many applications the size and shape (form factor) of RFID devices, and mechanical properties such as flexibility, are critical. For reasons such as security, aesthetics, and manufacturing efficiency there is a strong tendency toward smaller form factors. Where thinness and flexibility are desired, it is important to avoid materials (such as bulky electronics) and constructions that add undue thickness or stiffness to the RFID tag or label. RFID devices on the other hand should have adequate electrical connections, mechanical support, and appropriate positioning of the components (chips, chip connectors, antennas). Structures for these purposes can add complexity, thickness and inflexibility to an RFID device.

Another significant form factor, for example in thin flat tags and labels, is the area of the device, and performance requirements of the antenna can affect this area. For example, in the case of a dipole antenna the antenna typically should have a physical length approximately one-half wavelength of the RF device's operating frequency. While the length of this type of antenna may be short for the operating frequency of an RF tag, it may still be larger than many desired RFID device form factors.

RFID tags and labels typically include an integrated circuit chip attached to an antenna. Typically the antenna is provided on a continuous web and the RFID chip is precisely placed onto an antenna using commercially available pick-and-place machines. These machines are relatively slow, and usually require an indexing process whereby the antenna web stops for a short period of time while the chip is placed onto an antenna on the antenna web. Since the spacing of antennas on the antenna web can be rather large, for example 5 to 8 cm (2 to 3 inches), the speed of the production process is further reduced because the antenna web must move a relatively large distance for the next placement operation to take place. Pick and place equipment generally has the highest placement rate when the chip placement locations are very close together.

In many applications it is desirable to reduce the size of the electronics as much as possible. In order to interconnect very small chips with antennas in RFID inlets, it is known to use a structure variously called "interposers", "straps", and "carriers" to facilitate device manufacture. Interposers include conductive leads or pads that are electrically coupled to the contact pads of the chips for coupling to the antennas. These pads may be used to provide a larger effective electrical contact area than a chip precisely aligned for direct placement without an interposer. The larger area reduces the accuracy required for placement of chips during manufacture while still providing effective electrical connection. Chip placement and mounting are serious limitations for high-speed manufacture. The prior art discloses a variety of RFID strap or interposer structures, typically using a flexible substrate that carries the strap's contact pads or leads. RFID devices incorporating straps or interposers are disclosed, for example, in U.S. Pat. No. 6,606,247 and in European Patent Publication 1 039 543, both of which are incorporated by reference herein in their entireties.

Although using straps or interposers is an extra step in the process of attaching an RFID chip to an antenna, straps or interposers offer an advantage in speed of transfer to the web of antenna structures. A second advantage to the interposer is a reduced requirement for placement accuracy onto the antenna. The contact pads on the interposer and antenna can be much larger than those required for the RFID chip connection, allowing for the use of interposer placement equipment with lower precision requirements.

Interposers offer the advantage that they may be attached to an antenna on a moving web. However, the web speed and production rate are still quite low. Some of the difficulty arises from the difference in spacing of the straps or interposers on the carrier web, and the spacing of the antenna structures to which the interposers will be attached.

One method of assembling interposers begins with a web of interposer leads or pads and a web of RFID chips. Typically the RFID chips are separated from the web and placed onto the interposer leads using pick-place techniques. The chip may be placed onto the interposer leads with a rotary pick-place device for picking RFID chips and placing the chips on interposer leads on a web, thereby forming an interposer. Alternatively, a web of chips may be laminated directly to a web of interposer leads.

As used in the specification and claims of the present patent application, the term "RFID circuit" encompasses both a chip, and an interposer incorporating a chip.

Often the "pitch" of the RFID chips on the web, also referred to as the center-to-center distance between adjacent elements, may be different than the pitch of the interposer leads or other electrical components on a web. The pitch of chips may be different than the pitch of an array of RFID tags or labels to be formed: (a) in the longitudinal (also called the "down web") direction; (b) in the transverse (or "cross web") direction, or (c) in both directions. The difference in pitch may be due to, for example, the size of the elements themselves, manufacturing considerations, and/or efficiency considerations. However, when placing RFID chips from a web having a first pitch to interposer leads on a web having a second pitch, the chips must be indexed to the interposer leads or vice versa. Similarly, when placing an interposer from a web having a first pitch to an antenna structure on a web having a second pitch, the interposers and/or antenna structures must be indexed. In the interest of efficiency, the indexing process should be performed as seamlessly as possible, preferably without interfering with the advance of the web containing the interposer leads or antenna structures.

Therefore, it is desirable to provide a method and device for placing electrical components from a first web having a first pitch onto electrical components on a second web having a second pitch, wherein any indexing of the components is performed without impeding the advance of the second web of electrical components.

From the foregoing it will be seen there is room for improvement of RFID transponder manufacturing processes.

SUMMARY OF THE INVENTION

A method of placing a chip onto an electrical component is provided, the method comprising: securing an RFID circuit to a transfer drum having at least one nozzle along a circumferential surface, rotating the transfer drum, and placing the chip onto an electrical component on a moving web. The rotating the transfer drum includes accelerating the transfer drum such that the tangential velocity of the at least one nozzle is substantially equal to the linear velocity of the moving web when the chip is placed onto the electrical component. The chip may be secured to the transfer drum while the transfer drum is stationary, then the transfer drum is accelerated while rotating the transfer drum.

In one embodiment, the RFID circuit comprises an RFID interposer that includes strap leads mounted to a chip, and the placing step includes coupling the interposer leads to an electrical component. The electrical component may be an antenna, and the placing step couples the interposer leads to the antenna.

In another embodiment in which the RFID circuit comprises an RFID interposer, the method may further include the step of separating or severing the interposer from a carrier web or sheet, prior to the securing step. Alternatively, the securing step may include transferring the RFID interposer to the transfer drum from another transfer member.

The transfer drum may include one or more nozzles along its circumferential surface. In the case of multiple nozzles, preferably the nozzles are spaced evenly around the circumferential surface of the transfer drum. In one embodiment, the transfer drum includes three nozzles spaced evenly around the circumferential surface of the transfer drum. For example, when the transfer drum is stationary, the nozzles may be at the twelve o'clock, eight o'clock, and four o'clock positions. In this embodiment, RFID circuits may be secured to the drum at the twelve o'clock position, and placed on electrical components at the six o'clock position.

According to another aspect of the invention, a method of placing an RFID circuit onto an electrical component is provided, the method includes: securing a RFID circuit to a transfer drum, rotating the transfer drum, and placing the RFID circuit onto an electrical component on a moving web. Rotating the transfer drum includes accelerating the transfer drum such that the tangential velocity of the RFID circuit is substantially equal to the linear velocity of the moving web when the RFID circuit is placed onto the electrical component.

According to another aspect of the invention, a method of placing an RFID circuit onto an electrical component is provided, the method includes: securing an RFID circuit to a primary drum, transferring the RFID circuit from a primary drum to a secondary drum, and placing the RFID circuit with the secondary drum onto an electrical component on a moving web. The transferring step includes adjusting the peripheral speed of at least one of the primary and secondary drums such that the peripheral speed of each drum is substantially equal. The placing step includes adjusting the peripheral speed of the secondary drum such that the peripheral speed of the secondary drum is substantially equal to the speed of the moving web.

According to yet another aspect of the invention, a placement device is provided comprising: at least one primary drum having at least one primary nozzle along a circumferential surface, at least one secondary drum having at least one secondary nozzle along a circumferential surface, at least one motor operatively coupled to at least one of the drums, wherein peripheral speeds of the drums are substantially equal when an axis of one of the primary nozzles is aligned with an axis of one of the secondary nozzles, and wherein the at least one secondary drum rotates at a variable rate that is a function of whether an axis of a secondary nozzle is aligned with an axis of a primary nozzle.

According to still another aspect of the invention, a placement device is provided comprising: at least one primary drum having at least one primary nozzle along a circumferential surface, at least one secondary drum having at least one secondary nozzle along a circumferential surface, drive means coupled to at least one of the drums, wherein peripheral speeds of the drums are substantially equal when an axis of one of the primary nozzles is aligned with an axis of one of the secondary nozzles, and wherein the at least one secondary drum rotates at a variable rate that is a function of whether an axis of a secondary nozzle is aligned with an axis of a primary nozzle.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

In the annexed drawings, which are not necessarily according to scale.

DETAILED DESCRIPTION OF THE INVENTION

A high-speed process includes removing RFID circuits from a carrier web having a first pitch and transferring the RFID circuits to electrical components, such as RFID antenna structures, on a moving web having a second pitch. Typically, the second pitch is greater than the first pitch. According to one method, a transfer drum transfers RFID circuits to a moving web of electrical components, such as antennas, by picking up a chip when the transfer drum is stationary, and transferring the chip to the moving web when the transfer drum is rotating such that a tangential velocity of the transfer drum is substantially equal to the linear velocity of the moving web. According to another method, a primary drum removes the RFID circuits from a carrier web having a first pitch, and transfers the RFID circuits to an intermittently or variably rotating secondary drum, which then places the RFID circuits onto an electrical component on a moving web having a second pitch.

Figure 1:
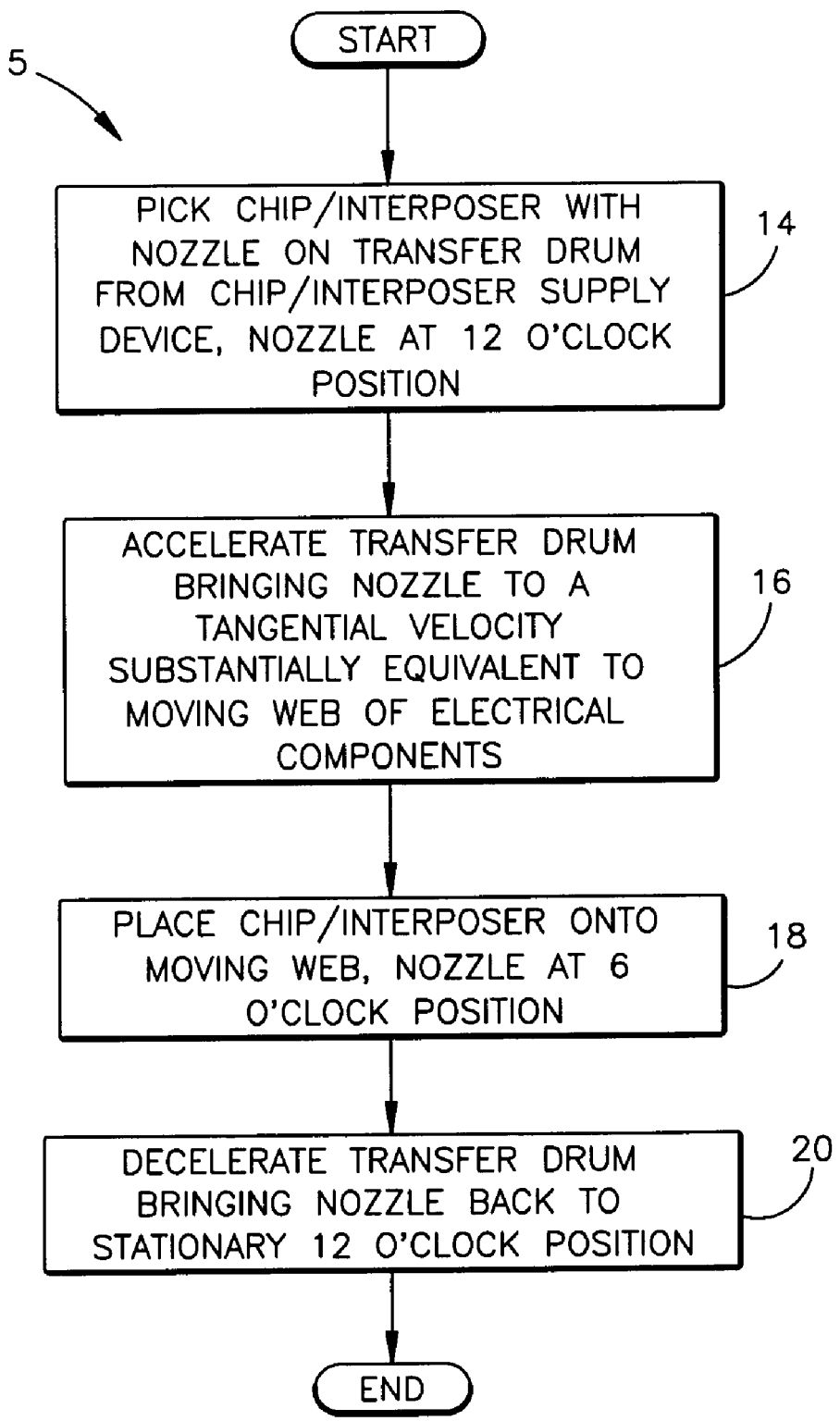
FIG. 1 is a flow chart showing a method of the present invention.

In FIG. 1, a flow chart is shown depicting a method 5 of placing an RFID circuit onto an antenna on a moving web. The method 5 of FIG. 1 will be described in relation to a transfer drum having a single vacuum port or nozzle. However, it will be understood that the method 5 is equally applicable to any single nozzle of a multi-nozzle transfer drum. Further, while the method is described with reference to nozzles or ports, the method does not require nozzles or ports.

The method 5 begins in process step 14 wherein a singulated chip is picked up by a nozzle on a transfer drum. In this embodiment, the transfer drum is momentarily stationary when an RFID circuit is picked up by the nozzle in the 12 o'clock position on the transfer drum. In process step 16, the transfer drum is accelerated such that the tangential velocity of the nozzle is substantially equal to the linear velocity of a moving web of electronic components when the nozzle reaches the 6 o'clock position. The RFID circuit is then transferred from the nozzle to the moving web of electronic components in process step 18. After the RFID circuit is transferred to the moving web of electronic devices, the transfer drum is decelerated, in process step 20, such that the nozzle is returned to the 12 o'clock position whereat the nozzle is in position to pick up another chip for transfer to the moving web of electrical components.

In one implementation of the nozzle of the transfer drum, the nozzle is a vacuum holder that engages and disengages RFID circuits using negative and positive pressures. However, the invention also encompasses mechanical securement of the RFID circuit to the transfer drum, and as used in this patent application the term "nozzle" encompasses not only vacuum securement but also mechanical securement of RFID circuits.

Figure 2A:
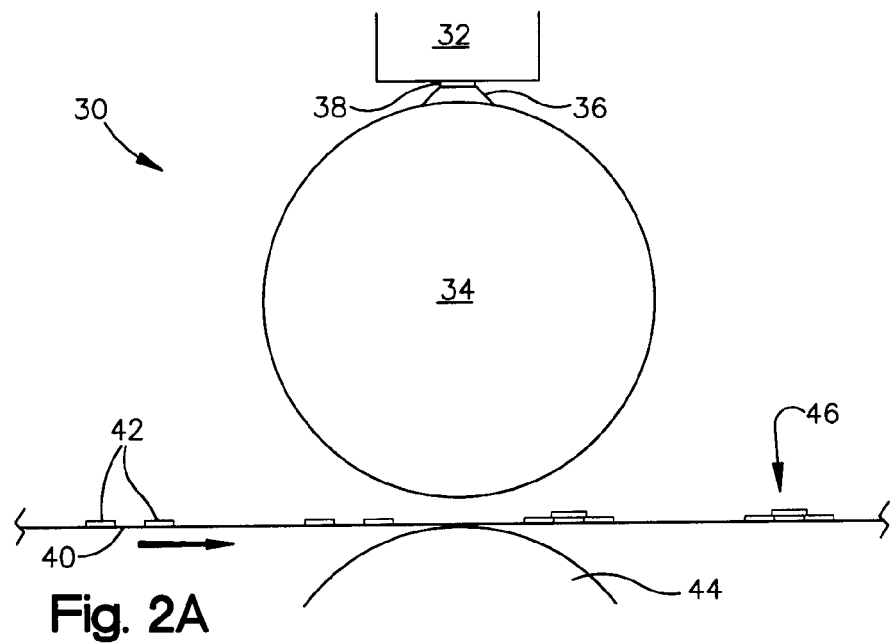
FIG. 2A is a side view of a single drum, one nozzle placement device according to the present invention.
Figure 2B:
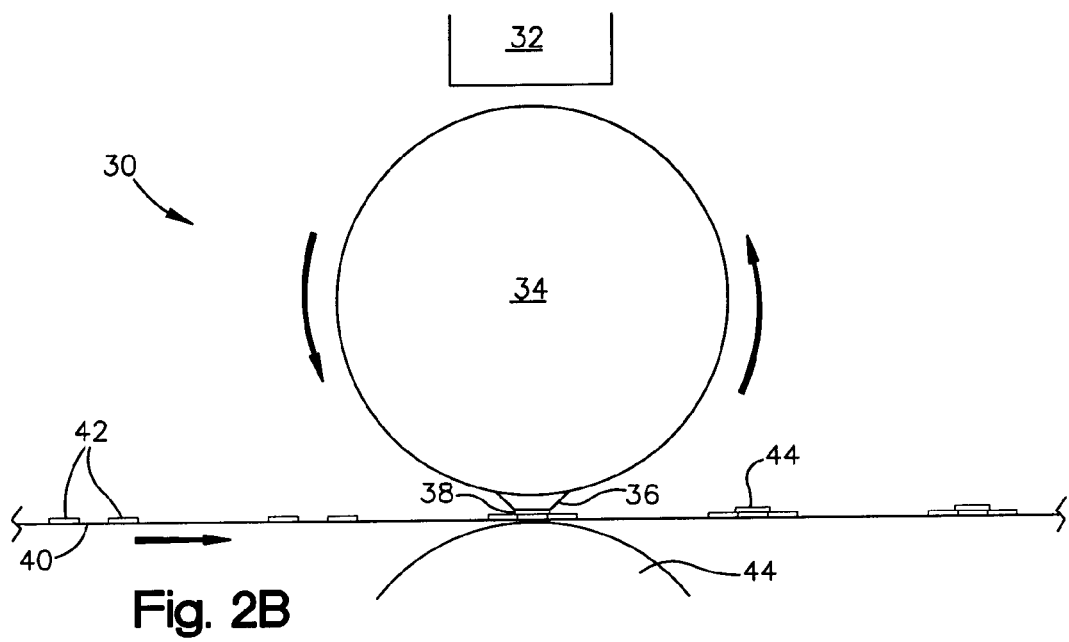
FIG. 2B is a side view of a single drum, one nozzle placement device according to the present invention.

Turning to FIGS. 2A and 2B, a high-speed placement device 30 is shown including an RFID circuit supply device 32 and a transfer drum 34 having a single vacuum port or nozzle 36 for transferring RFID circuits 38 from the supply device 32 to a web 40 of electronic components 42, and a base roller 44. As shown in FIG. 2A, the transfer drum 34 is positioned between the RFID circuit supply device 32 and a base roller 44 with the nozzle 36 at the 12 o'clock position. The base roller 44 typically rotates clockwise at a suitable speed thereby advancing the web 40 of electrical components 42 at a constant rate from left to right. When rotating, the transfer drum 34 rotates counterclockwise. In this embodiment, the nozzle 36, through selective application of negative pressure, picks an RFID circuit 38 from the supply device 32 while the transfer drum 34 is momentarily stationary with the nozzle 36 at the 12 o'clock position. Once an RFID circuit 38 is secured to the nozzle 36, the transfer drum 34 rotates counter-clockwise accelerating to a placement velocity at which time the nozzle 36 and the RFID circuit 38 have a tangential velocity substantially equal to the linear velocity of the moving web 40. In FIG. 2B, the nozzle 36 with RFID circuit 38 secured thereto is shown in the 6 o'clock position with the transfer drum 34 rotating such that the tangential velocity of the nozzle 36 and/or RFID circuit 38 is substantially equal to the linear speed of the moving web 40. The RFID circuit 38 is then transferred to an electronic component 42 on the web 40 by selective removal of the negative pressure and/or application of positive pressure. The transfer drum 34 may be situated such that the nozzle 36 forces the RFID circuit 38 against the electrical component 42 on the web 42. After the RFID circuit 38 is placed, the transfer drum 34 continues rotating counterclockwise thereby returning the nozzle 36 to the 12 o'clock position whereat the nozzle 36 is once again stationary and in position to pick up another RFID circuit 38 from the supply device 32.

In the present embodiment, the transfer drum accelerates from zero revolutions per minute (RPM's) at the 12 o'clock position to the placing velocity at the 6 o'clock position and back to zero RPM's at the 12 o'clock position. Thus, the transfer drum 34 must accelerate from stationary to placing velocity within 180 degrees of rotation (i.e., between the 12 o'clock picking position and the 6 o'clock placing position). It will be appreciated that the manner in which the placing drum 34 is accelerated and decelerated during one revolution, also referred to herein as the velocity profile of the placing drum, may be any suitable manner depending on a variety of factors such as the total throughput rate of the placement device 30, the rate at which RFID circuits 38 can be supplied to the transfer drum 34, the minimum time required for an RFID circuit 38 to be secured to a vacuum port or nozzle 36 of the transfer drum 34, etc.

Figure 3A:
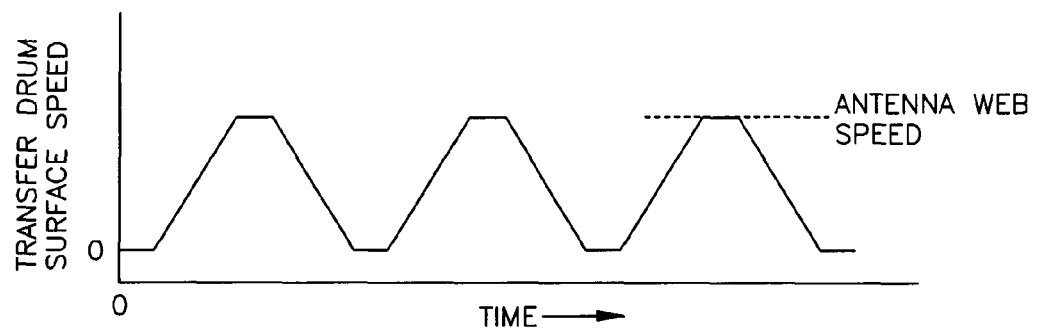
FIG. 3A is a graph illustrating a velocity profile of a transfer drum.
Figure 3B:
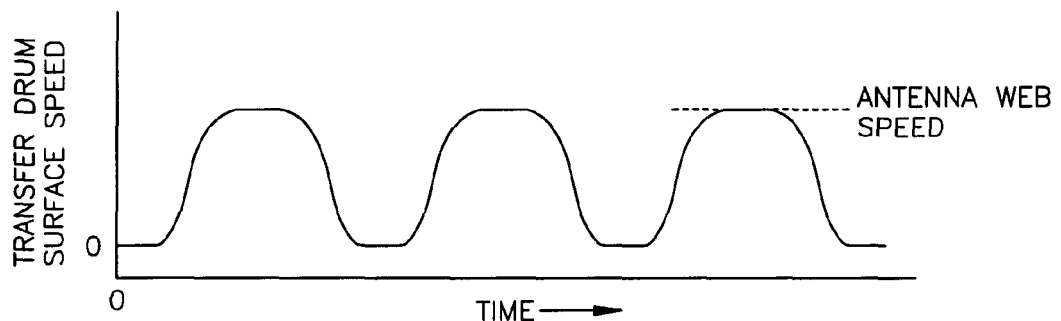
FIG. 3B is a graph illustrating a velocity profile of a transfer drum.

In an embodiment in which an RFID circuit is singulated and then secured to the transfer drum, the velocity profile of the transfer drum typically will include a dwell time, or time interval when the transfer drum is held stationary to receive and hold the singulated RFID circuit. FIGS. 3A and 3B show two exemplary velocity profiles for the transfer drum. FIG. 3A shows a velocity profile with a straight line increase in velocity from stationary to full speed, while FIG. 3B shows an example of an arcuate velocity profile. Each of these transfer drum velocity profiles are for transfer drums with three nozzles, and the profiles include dwell regions at 0°, 120°, and 240° of the rotation cycle. Other transfer drum configurations may also have similar velocity profiles.

Figure 4:
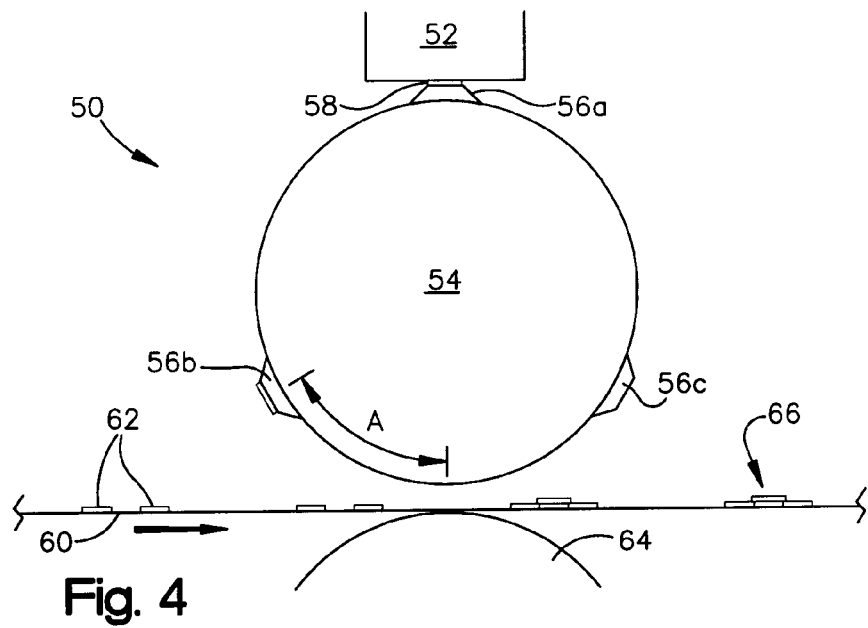
FIG. 4 is a side view of a single drum three nozzle placement device according to the present invention.
Figure 5:
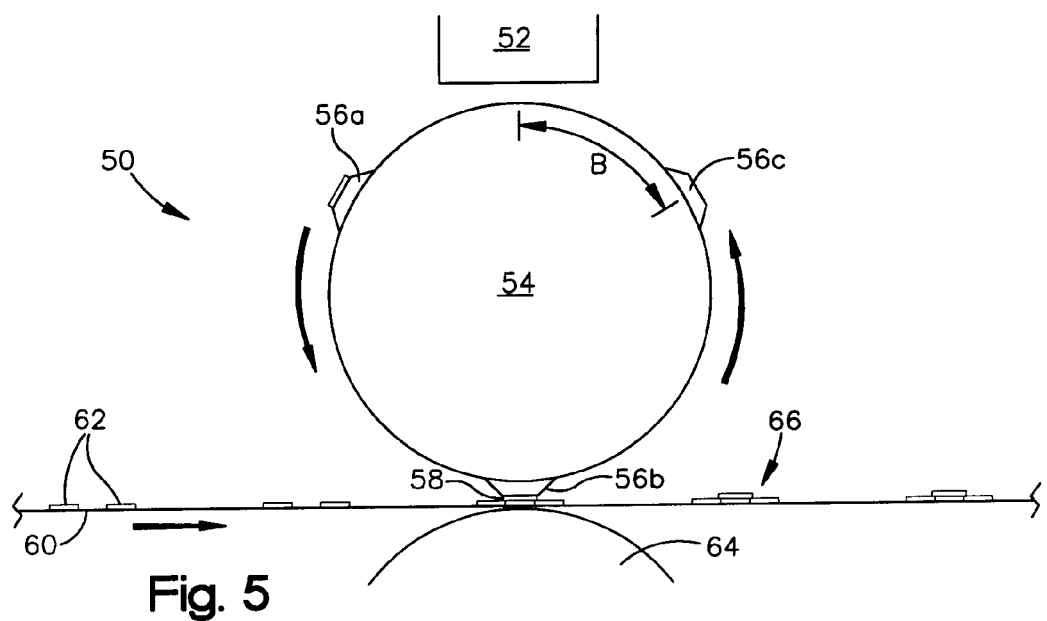
FIG. 5 is a side view of a single drum three nozzle placement device according to the present invention.

Turning now to FIGS. 4 and 5, a high-speed placement device 50 having a three nozzle transfer drum 54 will be described. The nozzles 56a, 56b, 56c in this embodiment are arranged around the circumference of the transfer drum 54 at 120 degree intervals. Thus, nozzle 56a is positioned at 12 o'clock, nozzle 56b is positioned at 8 o'clock, and nozzle 56c is positioned at 4 o'clock in FIG. 4. An RFID circuit supply device 52 is located above the 12 o'clock position of the transfer drum 54. A web 60 of electrical components 62 moves from left to right below the transfer drum 54 via the base roller 64. In FIG. 4, the transfer drum 54 is momentarily stationary allowing nozzle 56a to pick up an RFID circuit 58 from the supply device 52.

Once the RFID circuit 58 is secured to nozzle 56a, the transfer drum 54 commences accelerating counter-clockwise rotation. In the three nozzle configuration of the present embodiment, the transfer drum 54 must accelerate from stationary to placing velocity and then decelerate back to stationary through an arc of 120 degrees. Thus, as seen in FIG. 4, the transfer drum 54 must achieve placing velocity within the 60 degree arc A, thereby rotating nozzle 56b to the 6 o'clock position for placing the RFID circuit 58 previously picked up from the RFID circuit supply device 52. The tangential velocity of the RFID circuit 52 secured to nozzle 56b when it reaches the 6 o'clock position is substantially equal to the linear velocity of the moving web 60 of electronic components 62. After the RFID circuit 58 is placed, the transfer drum 54 decelerates to zero RPM's within the 60-degree arc B shown in FIG. 5, thereby bringing nozzle 56c to the 12 o'clock position.

It will be appreciated that in the present embodiment, the transfer drum 54 intermittently rotates in 120-degree intervals. During each 120 degree rotation interval, a first nozzle in the 12 o'clock position, which may be any one of nozzles 56a, 56b, or 56c, picks up an RFID circuit 58 from the supply device 52 when the transfer drum 54 is stationary. The transfer drum 54 then accelerates through an arc of 60 degrees until a second nozzle 56a, 56b, or 56c as appropriate is rotating such that the tangential velocity of the nozzle is substantially equal to the linear velocity of the moving web 60, at which time an RFID circuit 58 is transferred to an electrical component 62 on the web 60. After the RFID circuit 58 is placed, the transfer drum 54 decelerates over a 60 degree arc until a third nozzle 56a, 56b, or 56c as appropriate is rotated into position to pick up an RFID circuit 58 from the supply device 52. It will be appreciated that other configurations of nozzles and/or multiple RFID circuit supply devices 52 are possible. Further, while the above description begins with nozzle 56a in the 12 o'clock position, any one of the nozzles 56a, 56b, or 56c could begin in the 12 o'clock position, with the remaining two nozzles assuming the remaining two relative positions as appropriate. Therefore, the above description describes but one of a many possible nozzle configurations that may be used in conjunction with the present invention.

As an alternative to the above described transfer drum configuration including three nozzles, other configurations and numbers of nozzles are possible. Configurations with odd numbers of nozzles, evenly spaced around the transfer drum, are compatible with the preferred type of velocity profile in which the transfer drum receives RFID devices at the 12 o'clock position while stationary, accelerates to the placing velocity at the 6 o'clock position and back to zero RPM's at the 12 o'clock position (perhaps over a series of sub-cycles as in FIGS. 3A, 3B). Configurations with even numbers of nozzle also are possible, however, such as a two nozzle configuration with dwell regions at nine o'clock (where RFID circuits are secured to the transfer drum) and at three o'clock. Increasing the number of nozzles beyond a few may be undesirable as it would reduce the angular interval over which transfer drum acceleration and deceleration would occur.

Figure 6:
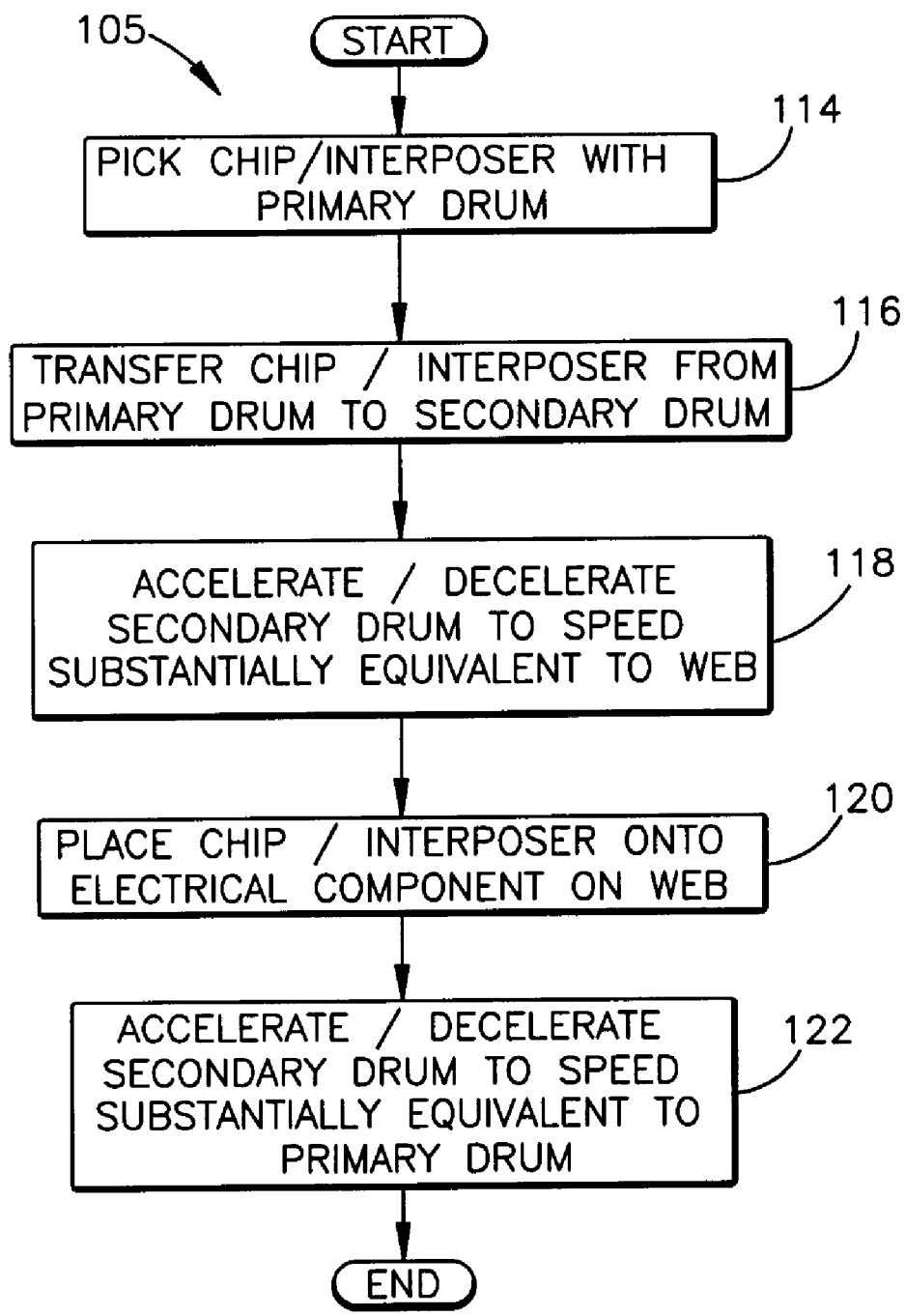
FIG. 6 is a flow chart showing a method of the present invention.

In FIG. 6, a flow chart is shown depicting a method 105 of placing an RFID circuit onto an antenna on a web at high speed using a two-drum placement device according to the present invention. The method 105 begins in process step 114, wherein an RFID circuit is picked by a primary drum. The primary drum may be equipped with a vacuum source for providing suction for temporarily securing the RFID circuit to the primary drum. The RFID circuit is then transferred from the primary drum to the secondary drum in process step 116. The transfer of the RFID circuit from the primary drum to the secondary drum may occur while the primary drum and secondary drum are momentarily stationary, or while the primary drum and secondary drum are rotating at substantially the same peripheral speed. In process step 118, the secondary drum is accelerated or decelerated such that the peripheral speed of the secondary drum is substantially equal to the speed of the web of electronic components, such as antenna structures. The RFID circuit is then placed onto the antenna structure on the antenna web in process step 120. The secondary drum is then accelerated or decelerated as appropriate, in process step 122, such that the peripheral speed of the secondary drum is substantially equal to the peripheral speed of the primary drum thereby preparing for the transfer of another RFID circuit from the primary drum to the secondary drum. After the RFID circuits are placed onto antenna structures, the RFID circuits subsequently may be coupled with the antenna structure in any suitable manner. The method 105 will further be described below with reference to FIGS. 7-13.

Figure 7:
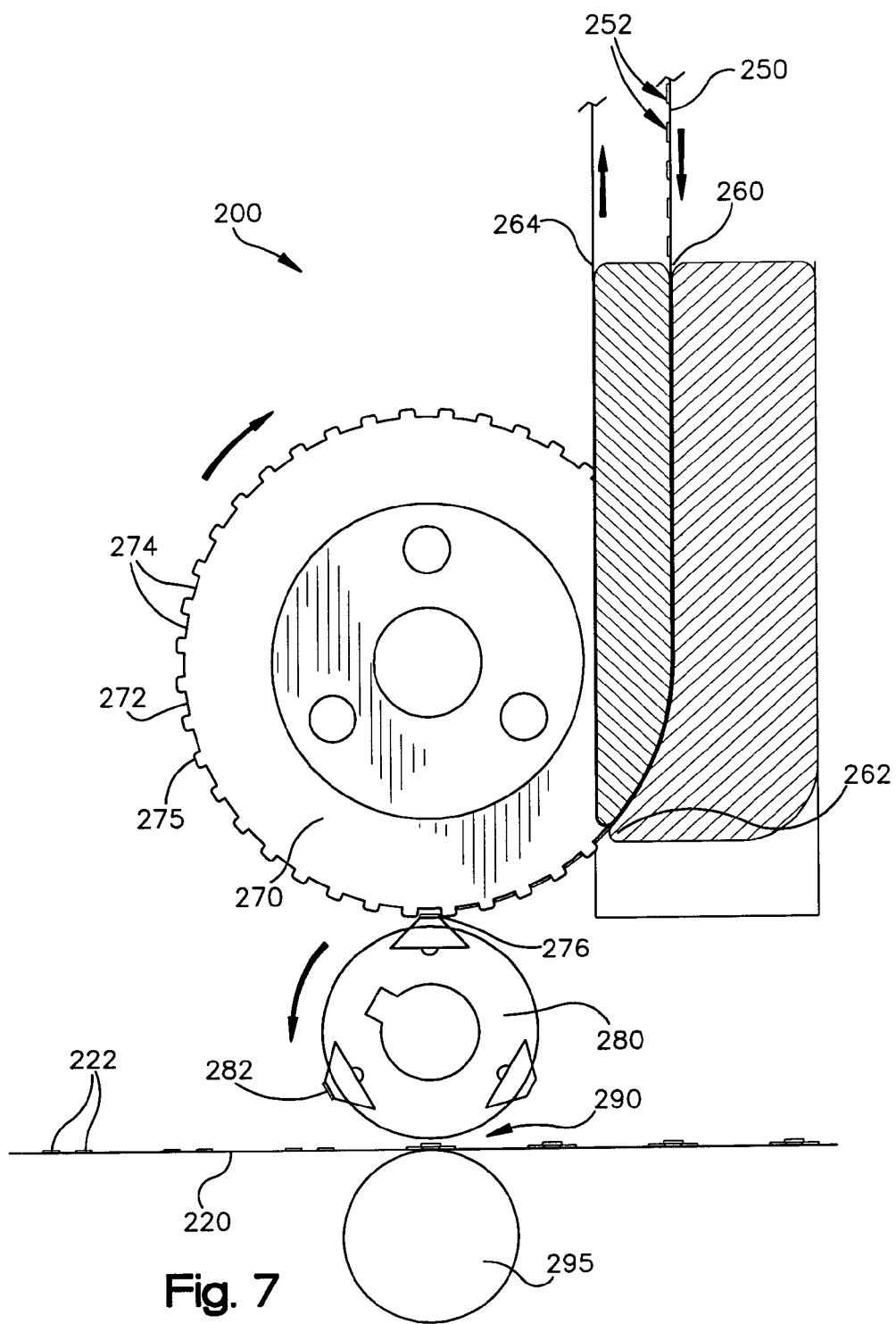
FIG. 7 is a side view of a two drum, three nozzle placement device according to the present invention.
Figure 8:
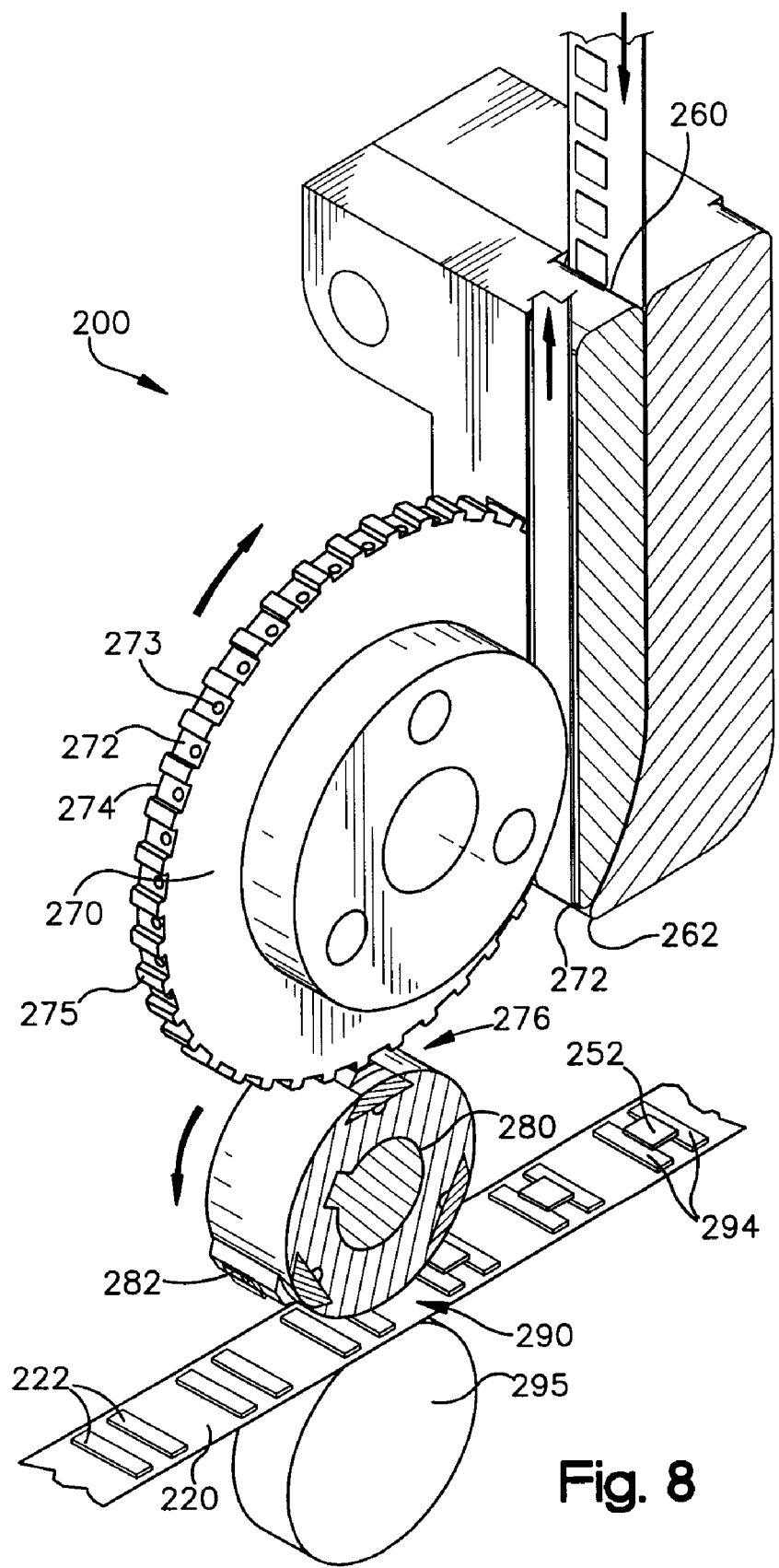
FIG. 8 is an oblique view of a two drum, three nozzle placement device according to the present invention.

In FIGS. 7 and 8, a high speed placement device 200 is shown. A web 220 of antenna structures 222 advances from left to right below the device 200 in both figures. A web 250 carrying RFID circuits 252 enters the high-speed placement device 200 through slot 260. An RFID circuit 252 is removed from the web 250 at peel tip 262, and the web 250 exits the device 200 at slot 264. As an RFID circuit 252 is separated from the web 250 at peel tip 262, it is picked up by the primary drum 270. The primary drum 270 may hold the RFID circuit 252 with a vacuum applied through a plurality of primary nozzles 273 in the primary drum surface 272. A plurality of recesses 274 and/or ridges 275 are also shown on the primary drum surface 272 for receiving the RFID circuits 252.

In the embodiment shown in FIGS. 7 and 8, the primary drum 270 rotates in a clockwise manner while the secondary drum 280 rotates counterclockwise. As the primary drum 270 rotates, an RFID circuit 252 picked by the primary drum 270 approaches the transfer position 276. The transfer position 276 in the illustrated embodiment corresponds to the six o'clock position of the primary drum 270 and the twelve o'clock position of the secondary drum 280. Other transfer positions are possible, such as a transfer position corresponding to the four o'clock position of the primary drum 270 and the 10 o'clock position of the secondary drum 280. Similarly, more than one primary drum may be positioned around the periphery of the secondary drum thereby enabling transfer of RFID circuits 252 to the secondary drum 280 at more than one location. For example, a secondary drum 280 may have two primary drums positioned at the two o'clock and ten o'clock positions of the secondary drum 280, respectively.

At the transfer position 276, an RFID circuit 252 is transferred from the primary drum 270 to the secondary drum 280. Prior to the transfer of the RFID circuit 252 from the primary drum 270 to the secondary drum 280, the secondary drum 280 is accelerated or decelerated such that, at the time of the transfer, the peripheral speed of the secondary drum's surface 282 is substantially equal to the peripheral speed of the surface 272 of the primary drum 270.

To facilitate the transfer of the RFID circuit 252 from the primary drum 270 to the secondary drum 280, the vacuum source in the primary drum 270 is released thereby removing the holding force on the RFID circuit 252 at surface 272. In addition, a vacuum source in drum 280 is activated to secure the RFID circuit 252 to its surface 282. To assist the release of the RFID circuit 252 from the primary drum 270, a positive pressure may be applied by the primary drum 270 thereby providing a separating force to the RFID circuit 252 at surface 272. The primary drum 270 and secondary drum 280 may be stationary during the transfer process of the RFID circuit 252 from surface 272 to surface 282, or alternatively the primary drum 270 and secondary drum 280 may rotate during the transfer of the RFID circuit 252.

As the web 220 of antenna structures 222 advances from left to right, an antenna structure 222 moves into the placing position 290 for accepting an RFID circuit 252. As the antenna structure 222 enters the placing position 290, the secondary drum 280 accelerates or decelerates as appropriate such that the peripheral speed of the surface 282 of the secondary drum 280 is substantially equal to the speed of the web 220. The rotation and speed of drum 280 is timed such that the RFID circuit 252 held to surface 282 contacts the antenna structure 222 on the web 220 at the placement position 290. At this time the vacuum source in the secondary drum 280 is removed and the RFID circuit 252 is placed onto the antenna structure 222 on the moving web 220. A positive pressure may be applied by the secondary drum 280 thereby providing a separating force to the RFID circuit 252 at surface 272.

The web 220 may include an adhesive or other means for securing the RFID circuit 252 to the antenna structure 222, thereby facilitating the transfer of the RFID circuit 252 from the secondary drum surface 282 to the antenna structure 222 on the web 220. For example, an adhesive may be applied to the web 220, the antenna structure 222, or both prior to the antenna structure 222 reaching the placement position 290. Typically, the secondary drum 280 need not make contact with the web 220 or the antenna structure 222 during the placement of the RFID circuit 252 to the antenna structure 222. However, in some instances, such as when a pressure sensitive adhesive is to be used to couple the RFID circuit 252 to the antenna structure 222, the secondary drum 280 may make contact with the web 220 and/or antenna structure 222 thereby providing pressure to activate the pressure sensitive adhesive. For this purpose, a backing roller or other member, such as shown at 44 in FIGS. 2A, 2B, 66 in FIGS. 4, and 5, and at 295 in FIGS. 7-10 may form a pressure nip to facilitate transfer of the RFID circuit to the web.

Figure 9:
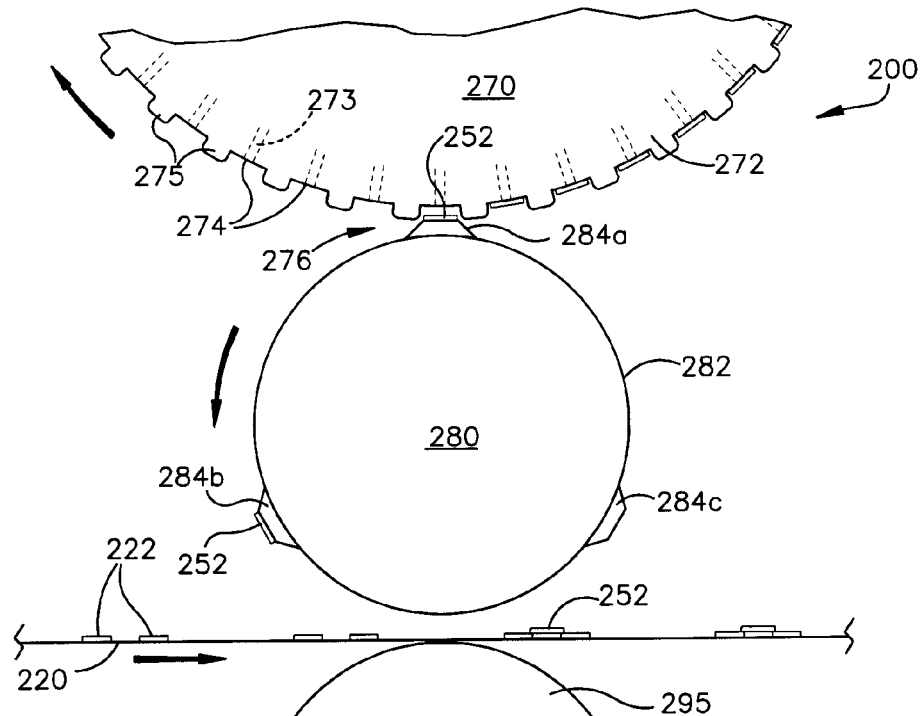
FIG. 9 is a side view of a two drum, three nozzle placement device showing the primary drum and the secondary drum during transfer of a chip from the primary drum to the secondary drum.
Figure 10:
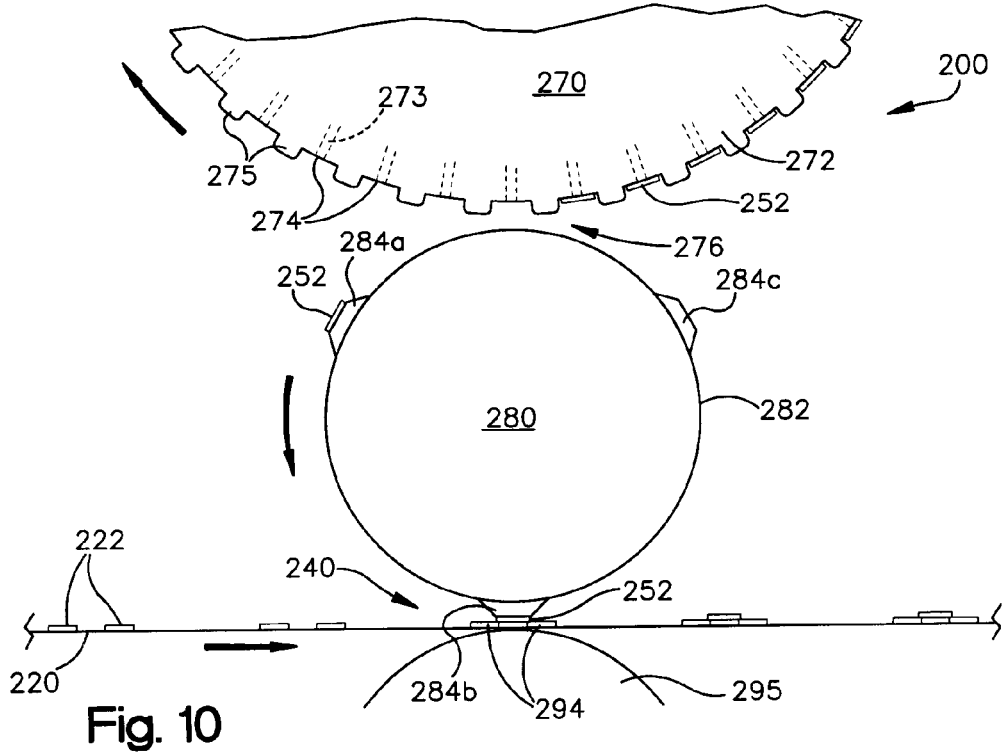
FIG. 10 is a side view of a two drum, three nozzle placement device showing the secondary drum placing a chip onto an antenna structure on a web.
Figure 11:
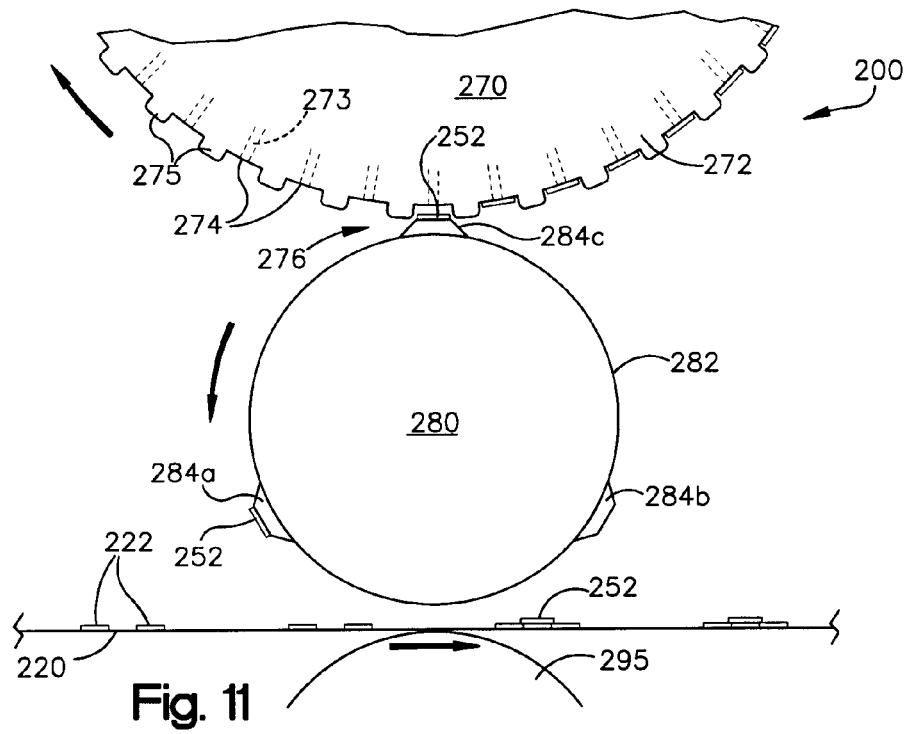
FIG. 11 is a side view of a two drum, three nozzle placement device showing the primary drum and the secondary drum during transfer of a chip from the primary drum to the secondary drum.

Turning now to FIGS. 9-11, the operation of the placing device 200, in particular the primary and secondary drums 270 and 280, will be described in detail. In FIG. 9, the primary drum 270 and secondary drum 280 are shown. The primary drum 270 includes a plurality of primary nozzles 273, recesses 274, and/or ridges 275 for receiving an RFID circuit 252. The primary drum 270 further includes a vacuum source for directing suction to the primary drum surface 272 for temporarily securing RFID circuits 252 thereto. The primary drum 270 in this embodiment rotates clockwise. RFID circuits 252 are shown secured to the primary drum 270 via the suction provided by the vacuum source. As the primary drum 270 rotates clockwise, the RFID circuits 252 secured to the primary drum surface 272 rotate into the transfer position 276 where they are transferred to the secondary drum 280. The primary drum 270 may rotate continuously, intermittently, or variably depending on the particular application.

In the illustrated embodiment, the secondary drum 280 includes three secondary nozzles 284a, 284b, 284c disposed at 120 degree intervals around the surface 282 of the secondary drum 280. It will be appreciated that in practice any suitable number of secondary nozzles may be used; however, for simplicity of explanation three secondary nozzles are shown. The secondary drum 280 also includes a vacuum source for directing suction to the secondary nozzles for temporarily securing RFID circuits 252 to the secondary nozzles.

In FIG. 9, a primary nozzle 273 and secondary nozzle 284a are in the transfer position 276. In the transfer position 276, the axes of a primary nozzle 273 and secondary nozzle 284a are aligned. Secondary nozzle 284b is shown with a chip 252 secured to it. Secondary nozzle 284c does not have a chip secured to it. The web 220 of antenna structures 222 is shown below the secondary drum 280 and advances from left to right in FIGS. 9 and 10.

In FIG. 10, the secondary drum 280 has been rotated approximately 60° counterclockwise from the position shown in FIG. 9. Secondary nozzle 284a is now shown with an RFID circuit 252 secured to it, the RFID circuit 252 having been transferred from the primary drum 270 as shown in FIG. 9. Secondary nozzle 284b is now in the placing position 290. Secondary nozzle 284c, having just placed an RFID circuit 252 onto an antenna structure 222 as shown in FIG. 9, is approaching the transfer position 276 where another RFID circuit 252 will be transferred thereto. In FIG. 10, the web 220 has advanced from left to right such that an antenna structure 222 is in the placing position 290. At this moment, the peripheral speed of the secondary drum 280 and/or secondary nozzle 284b is substantially equal to the speed of the web 220, the secondary drum having been accelerated or decelerated such that the peripheral speed of secondary nozzle 284b is substantially equal to the speed of the web 220. Thus, while the web 220 may be advancing at high speed, there is essentially no relative motion between secondary nozzle 284b and the web 220. When secondary nozzle 284b is in the placing position 290, the vacuum source supplying suction to secondary nozzle 284b is removed, thereby eliminating the force securing the RFID circuit 252 to secondary nozzle 284b, and the RFID circuit 252 is placed onto the antenna structure 222.

After placing the RFID circuit 252 onto the antenna structure 222, the secondary drum 280 continues rotating counterclockwise such that secondary nozzle 284c advances into the transfer position 276, as shown in FIG. 11. As secondary nozzle 284c approaches the transfer position 276, the secondary drum 280 is accelerated or decelerated such that the peripheral speed of secondary nozzle 284c of the secondary drum 280 is substantially equal to the peripheral speed of the surface 272 and/or primary nozzle 273 of the primary drum 270 at the transfer position 276. As previously mentioned, the primary drum 270 and secondary drum 280 may be momentarily stationary during the transfer step.

It will be appreciated that the indexing of an RFID circuit 252 to an antenna structure 222 is achieved by the variable rotation, or acceleration and/or deceleration, of the primary drum 270 and/or secondary drum 252. Thus, the two-drum placing device of the present embodiment may allow indexing of RFID circuits to electrical components having a greater pitch than a single drum placing device because both the primary and secondary drum can perform a portion of the indexing function. The primary drum may rotate intermittently to perform an indexing function in the same manner in which the secondary drum rotates intermittently to index the RFID circuit to the web of electrical components.

Figure 12:
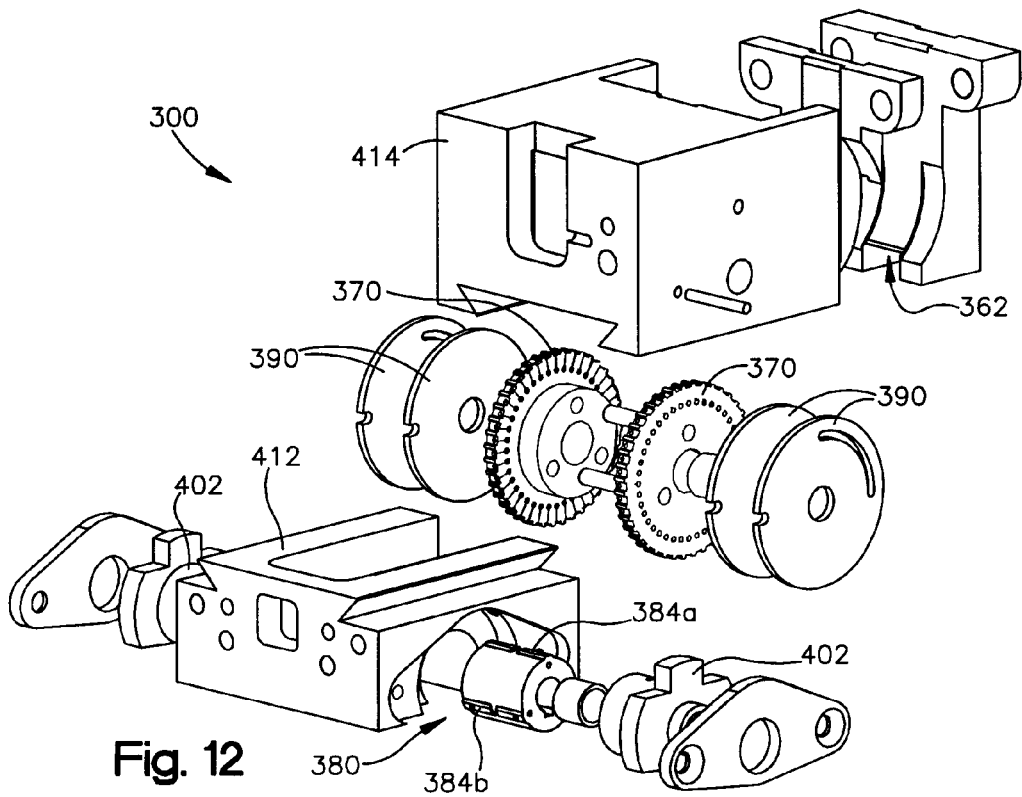
FIG. 12 is an exploded view of an embodiment of the invention.

Turning to FIG. 12, an exploded view is shown of a high speed placement device 300 according to another embodiment of the invention. The device 300 includes a peel point 362, two primary drums 370, and a secondary drum 380. In this embodiment, the two primary drums 370 transfer RFID circuits to the secondary nozzles 384a, 384b, and 384c (384c not shown in FIG. 12) of the secondary drum 380. In this configuration, the secondary drum 380 may place RFID circuits to a web having more than one lane of antenna structures. The device 300 further includes end plates 390 on each side of the primary drums 370. Bearings 402 support the secondary drum 380, and the upper and lower housing 412 and 414 enclose the device.

Figure 13:
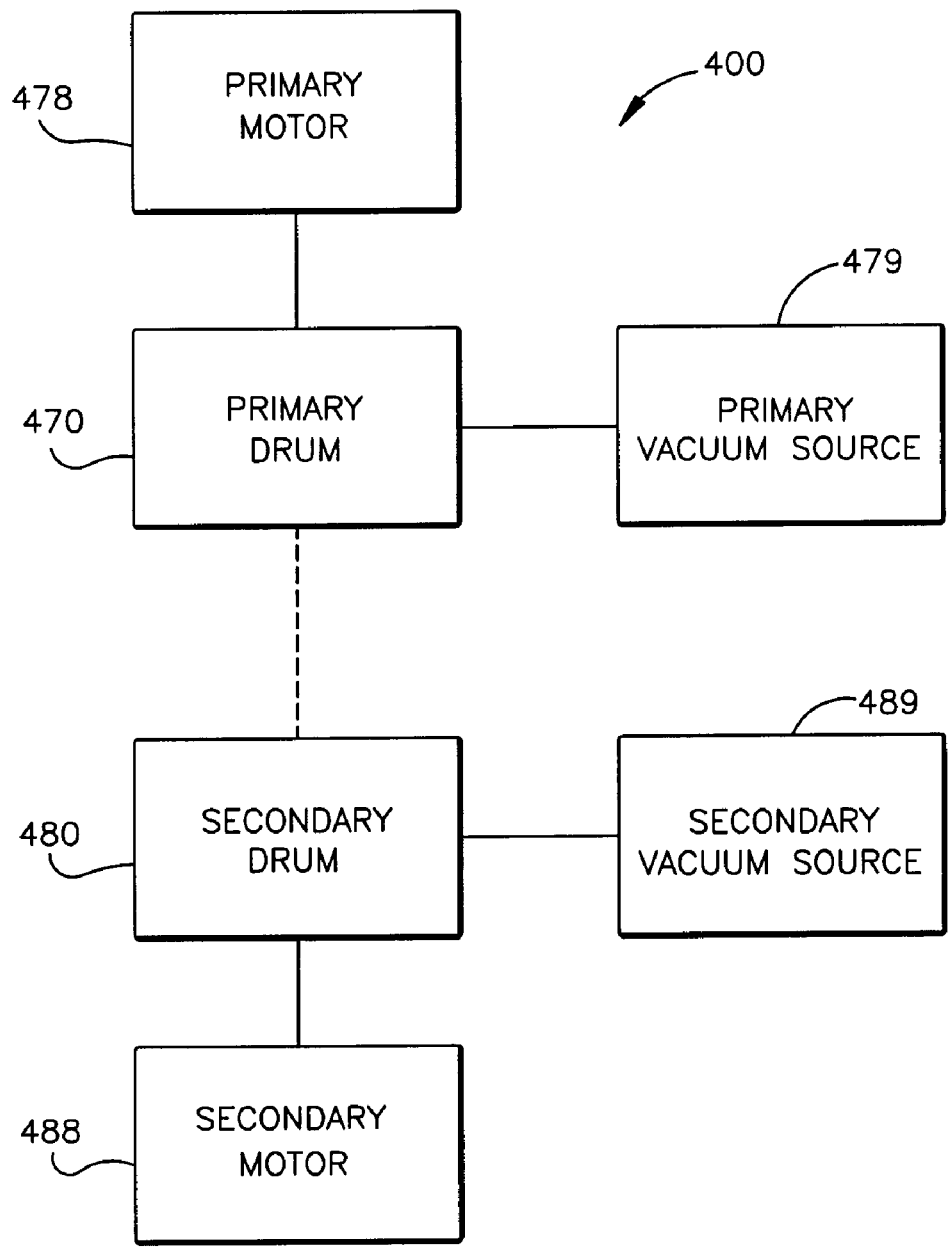
FIG. 13 is a schematic diagram of an embodiment of the invention.

In FIG. 13, a schematic diagram illustrates the a speed placement device 400 including a primary drum 470, a motor 478 coupled to the primary drum 470, and a vacuum source 479 coupled to the primary drum 470. The secondary drum 480 includes a motor 488 and a vacuum source 489 coupled thereto. It will also be appreciated that a single motor and a single vacuum source may be coupled to both the primary drum 470 and the secondary drum 480. Any suitable motor may be used to provide rotational force to the drums. For example, electric or hydraulic motors may be coupled to the drums to provide rotational force. In addition, suitable gearing and transmission assemblies may be used to couple a motor or other drive means to the drums.

It will be appreciated that any suitable number of primary drums may be used to transfer chips or straps to one or more secondary drums. The primary drums may be arranged along a common axis to transfer RFID circuits to one or more secondary drums as shown in FIG. 12, thereby allowing the simultaneously placement of more than one RFID circuit to a plurality of antenna structures in more than one lane on one or more webs. It will further be appreciated that more than one primary drum may transfer RFID circuits to a secondary drum, wherein the primary drums are arranged at different peripheral locations around the circumference of the secondary drum.

It will also be appreciated that the relative speeds of the primary drum(s) and secondary drum(s) in any of the above embodiments may be controlled by suitable gears and/or electric motors. For example, stepper motor drives may be used to control the relative speeds of the drums. The use of stepper motor drives with computer or other digital controls may be advantageous by allowing for the simple adjustment of the high-speed placement device to accommodate RFID circuit webs and antenna webs having a wide variety of component pitches.

In a typical application of RFID circuits to antenna structures, the secondary drum will be accelerated when a secondary nozzle is rotated between the transfer position and the placement position such that the peripheral speed of a particular secondary nozzle is greater at the placement position than at the picking position. Because the peripheral speed of the secondary nozzles at the placement position may be adjusted, and the rate of advancement of the web of antenna structures may be adjusted, the present invention allows the placement of RFID circuits to antenna structures on webs having a wide variety of pitches.

It will further be appreciated that, to aid in placement of the RFID circuits onto the antenna structures, vision systems may be employed to read fiducial marks and/or antenna positions and provide feedback to the control systems controlling the primary and secondary drums, the RFID circuit carrier web, and/or the web of antenna structures. Further, methods other than a peel tip may be used to singulate the RFID circuits from the carrier web. For example, the carrier web may be die cut thereby singulating the RFID circuits prior to picking by a primary drum. Alternatively, the carrier web may pass between a cutter member and a primary drum, wherein the cutter member singulates the RFID circuits by cutting the web using the primary drum as an anvil.

The placing device described above allows RFID circuits of a first pitch (typically, relatively small) on a first carrier web to be transferred to antennas or other electrical components on second web having a second pitch (typically, relatively large), with no change in speed of the second web. The RFID circuit carrier web may have constant, intermittent or variable speed as required to provide a suitable number of RFID circuits to the primary drum. Similarly, the primary drum may have constant, intermittent, or variable rotational speed as required to receive adequate RFID circuits from the carrier web and supply adequate RFID circuits to the secondary drum.

It will be appreciated that in any one of the above embodiments, the tangential or peripheral velocity of an RFID circuit secured to a drum may be substantially equal to the linear velocity of a moving web during placement. Throughout the foregoing description, reference has been made to a tangential or peripheral velocity of a drum's surface being substantially equal to the a linear velocity of a web when an RFID circuit is placed onto an electrical component on the web. However, in some configurations, particularly in a configuration employing nozzles that extend outward from the peripheral surface of a drum, it will be appreciated that it is the tangential velocity of the nozzles and/or RFID circuits secured thereto that is substantially equal to the linear velocity of the moving web of electrical components. Therefore, it will be understood that a drum's surface is intended to be the surface to which an RFID circuit is secured.

Certain modifications and improvements will occur to those skilled in the art upon a reading of the foregoing description. It should be understood that the present invention is not limited to any particular type of wireless communication device, or interposers. The term "electronic component" may comprise an electrical circuits or electrical device, and in the preferred embodiment comprises an antenna. The antenna may include a single antenna portion, or a plurality of separate antenna portions. Further, a wide variety of antenna designs may be used with the present invention such as loop, slot, or patch antennas. For the purposes of this application, couple, coupled, or coupling may encompass both mechanical coupling and electrical coupling. Mechanical coupling includes physically securing the interposer to an electronic component. Electrical coupling includes forming an electrical connection between the interposer and electronic component. An electrical connection includes directly connecting or reactively coupling an interposer to an electronic component. Reactive coupling is defined as either capacitive or inductive coupling, or a combination of both. Capacitive coupling may involve putting the interposer into close proximity with an electronic component, with dielectric pads therebetween, to allow capacitive coupling between the interposer and the electronic component. The dielectric pads may include a nonconductive adhesive, such as a pressure-sensitive adhesive, for example Fasson adhesives S4800 and S333 available from Avery Dennison Corporation, and a high dielectric constant material, such as a titanium compound, for example titanium dioxide or barium titanate. The dielectric pads have an effective dielectric constant that is a non-constant function of thickness of the dielectric pads. For example, the dielectric pads may include conductive particles, such as aluminum and/or nickel particles, to minimize the effect of changes in thickness on the capacitive coupling. The dielectric pads may have a thickness of about 0.025 mm (0.001 inches) or less.

The methods of the invention, though described in relation to RFID chips, strap, interposers and antenna structures, may be advantageous for placing chips directly to antennas or placing chips onto interposer leads. For example, in any of the above embodiments, interposer leads may be substituted for an antenna structure and a chip may be placed onto the interposer leads instead of an antenna structure.

One of ordinary skill in the art will recognize that there are different manners in which these elements can accomplish the present invention. The present invention is intended to cover what is claimed and any equivalents. The specific embodiments used herein are to aid in the understanding of the present invention, and should not be used to limit the scope of the invention in a manner narrower than the claims and their equivalents.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A placement device comprising:
   at least one primary drum having at least one primary nozzle along a circumferential surface;
   at least one secondary drum having at least one secondary nozzle along a circumferential surface;
   at least one motor operatively coupled to at least one of the drums;
   wherein peripheral speeds of the drums are substantially equal when an axis of one of the primary nozzles is aligned with an axis of one of the secondary nozzles,
   wherein the at least one secondary drum rotates at a variable rate that is a function of whether an axis of a secondary nozzle is aligned with an axis of a primary nozzle; and
   wherein, in rotation, the secondary drum rotates at a minimum speed when the axis of the secondary nozzle is aligned with the axis of the primary nozzle.

2. The device of claim 1, wherein the at least one primary drum includes a plurality of recesses around its periphery.

3. The device of claim 1, wherein the at least one primary drum includes a vacuum source coupled to the at least one primary nozzle.

4. The device of claim 1, wherein the variable rotation rate of the secondary drum results in a peripheral speed of the secondary drum that is greater than the peripheral speed of the primary drum.

5. The device of claim 1, wherein the variable rotation rate of the secondary drum results in a peripheral speed of the secondary drum that is less that the peripheral speed of the primary drum.

6. The device of claim 1, wherein the variable rotation rate of the secondary drum results in a peripheral speed of the secondary drum that is equal to the peripheral speed of the primary drum.

7. The device of claim 1, wherein the secondary drum includes three secondary nozzles disposed at 120 degree intervals around the outer edge of the secondary drum.

8. The device of claim 1, wherein the secondary drum includes a vacuum source for temporarily securing the chip to the secondary drum.

9. The device of claim 1, wherein the primary drum and secondary drum rotate in opposite directions in a common plane.

10. The device of claim 1, wherein the at least one motor device is an electric motor.

11. The device of claim 1, wherein the at least one motor device is a stepper motor.

12. The device of claim 1, wherein the securing includes transferring the RFID circuit from a supply device to the primary drum.

13. A placement device comprising:
   at least one primary rotary placement device having at least one primary nozzle along a circumferential surface;
   at least one secondary rotary placement device having at least one secondary nozzle along a circumferential surface;
   at least one motor operatively coupled to at least one of the rotary placement devices;
   wherein peripheral speeds of the rotary placement devices are substantially equal when an axis of one of the primary nozzles is aligned with an axis of one of the secondary nozzles,
   wherein the at least one secondary rotary placement device rotates at a variable rate that is a function of whether an axis of a secondary nozzle is aligned with an axis of a primary nozzle; and
   wherein, in rotation, the secondary rotary placement device rotates at a minimum speed when the axis of the secondary nozzle is aligned with the axis of the primary nozzle.

* * * * *